Oct. 17, 1939.  H. H. NICHOLSON  2,176,542
AIRPLANE
Filed Sept. 3, 1937
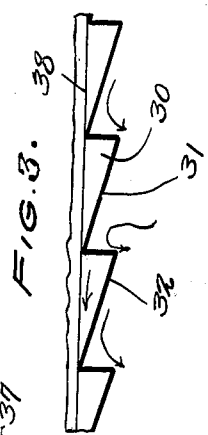
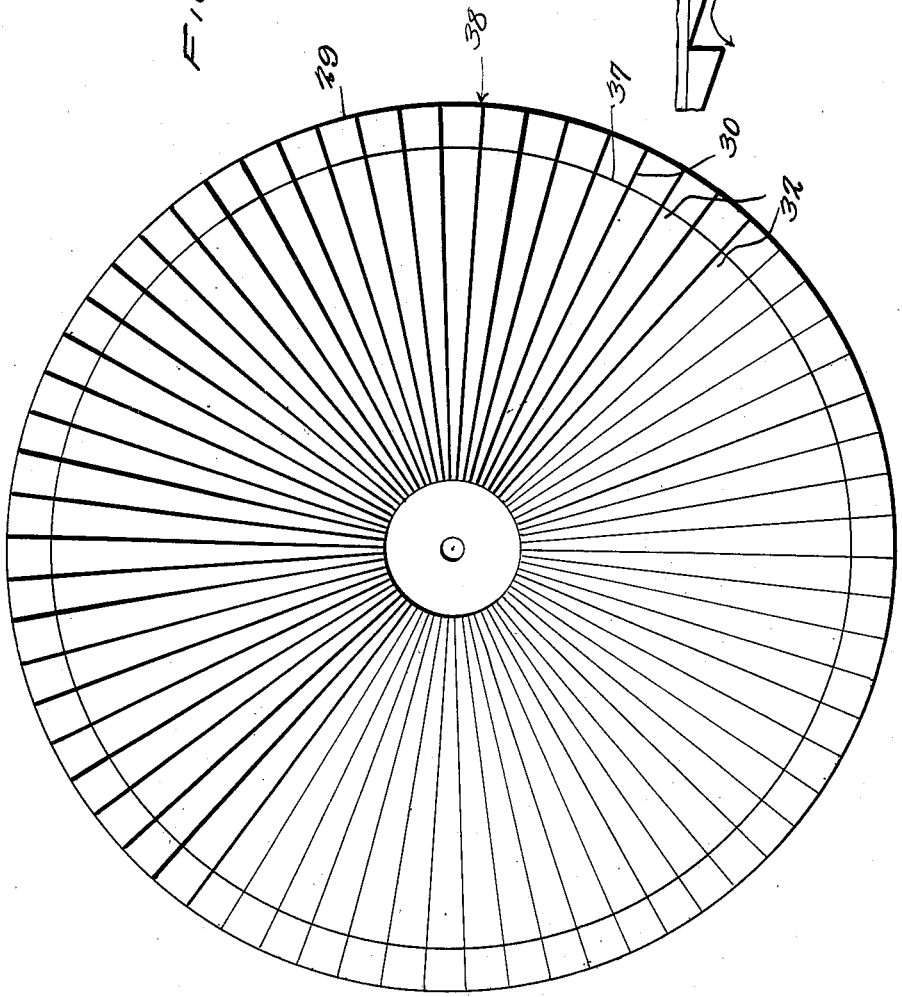
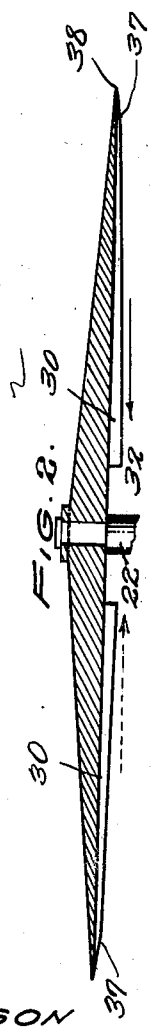
HENRY H. NICHOLSON
INVENTOR.
BY *[signature]*
ATTORNEYS.

Patented Oct. 17, 1939

2,176,542

UNITED STATES PATENT OFFICE 2,176,542

AIRPLANE

Henry Harrison Nicholson, Boulder, Colo.

Application September 3, 1937, Serial No. 162,341

4 Claims. (Cl. 244—39)

This invention relates to airplanes, one of the objects being to eliminate the drag resulting from the use of broad surfaces as sustaining planes, this drag being caused by the vacuum created and which is utilized to sustain the machine in place.

An object of the invention is to provide an airplane of such construction that it is less dependent upon the creation of a vacuum in order to be sustained in the air while in flight so that it thus is possible to maintain higher speed than otherwise due to the elimination of the objectionable drag.

A further object is to utilize rotating planes of novel construction whereby the rotation of the planes is set up by wind resistance due to the forward movement of the airplane, such rotation resulting in reduction of drag due to friction and vacuum.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing

Figure 1 is a bottom plan view of one of the rotating planes.

Figure 2 is a central section therethrough.

Figure 3 is an enlarged side elevation of a portion of the plane showing more in detail some of the ribs forming the bottom surface.

It is to be understood that any desired number of planes such as constitutes the present invention, can be used in connection with the fuselage of an airplane. In every case it is necessary to provide an upstanding axle 22 which provides a bearing for the rotating plane 29 which is circular and mounted at its center on said axle. This plane is preferably increased in thickness gradually from its periphery toward its center and the bottom surface thereof is formed with radial ribs 30 each having a shoulder 31 at one side and an inclined plane 32 constituting the bottom surface of the ribs and extending upwardly to the top of the shoulder of the next adjoining rib. All of these planes 32 are of the same pitch.

When taking off with an airplane equipped with one or more planes 29 such as herein described, the plane or planes are tilted to the proper angle. As the airplane is propelled forwardly in the usual way, the wind resistance encountered by the shoulders 31 on the revolving plane or planes 29 will cause the same to rotate at a speed dependent upon the forward speed of the airplane.

When the ribs depending from a plane at one side of the airplane receive thrust from the air in front of them, the ribs located at the opposite side of the airplane will glide over the air, thereby offering minimum resistance to the forward motion of the airplane and at the same time setting up a certain downward displacement of the air having a limited sustaining effect.

It will be apparent from the foregoing that as the machine moves forwardly, the revolving plane 29 will glide over the air while encountering minimum resistance or setting up a greatly reduced drag with the result that a quicker and more abrupt take-off or landing is possible than otherwise. Furthermore, after the airplane has attained a predetermined speed, the rapidly rotating plane 29 will act as a gyroscope to stabilize the machine in flight.

While it is preferred in practice to use two revolving planes such as described, it is to be understood that this number can be varied.

Attention is called to the fact that the outer ends of the ribs are beveled as shown at 37, these beveled portions being inclined upwardly and outwardly to the sharp edge of the rotating plane shown at 38. By providing a construction of this type, wind resistance is practically eliminated while said beveled portions are swinging oppositely to the direction of movement of the airplane.

In order to make the rotating plane of maximum efficiency, it is preferred to fasten the ribs to the bottom surface of the plane so that their beveled ends will extend outwardly to the cutting edge of the plane.

What is claimed is:

1. A rotary sustaining plane comprising a disk having radial ribs on its undersurface, each rib being formed with a shoulder at one side occupying a plane extending to and longitudinally of the axis of rotation of the disk, and with an inclined bottom surface leading to the top of the shoulder of the next adjoining rib.

2. A sustaining plane including a freely rotatable imperforate disk, and radially disposed means upon the lower surface of the rotatable disk for receiving impact of air in the path of the plane to rotate the plane, said means having inclined surfaces for displaying air downwardly while they are moving in the direction of flight, and radial shoulders interposed between and connecting said inclined surfaces, each shoulder lying in a plane extending lonigtudinally of the axis of rotation of the disk, the upper edges of all of the shoulders occupying a plane perpendicular to said axis of rotation.

3. A rotary sustaining plane comprising a disk having radial ribs on its undersurface, each rib being formed with a shoulder at one side and with an inclined bottom surface leading to the top of the shoulder of the next adjoining rib, the outer end portion of each rib being beveled upwardly and outwardly to the edge of the disk on which it is mounted.

4. A sustaining plane mounted to rotate freely including a disk having radial ribs on its bottom surface terminating at their inner ends adjacent to the axis of rotation of the disk and at their outer ends at the margin of the disk, each rib comprising a radial shoulder occupying a plane extending longitudinally of said axis of rotation and an inclined surface extending from the lower edge of said shoulder to the upper edge of the next adjoining shoulder, each rib being tapered from its inner end outwardly to a vanishing point at the margin of the disk.

HENRY HARRISON NICHOLSON.